Patented Jan. 22, 1952

2,583,194

UNITED STATES PATENT OFFICE 2,583,194

VITAMIN A DERIVATIVES AND METHODS OF PREPARING THE SAME

Leonard Weisler, Rochester, N. Y., assignor, by mesne assignments, to Eastman Kodak Company, Rochester, N. Y., a corporation of New Jersey No Drawing. Application April 27, 1948,
Serial No. 23,628

6 Claims. (Cl. 260—563)

This invention relates to vitamin A derivatives and intermediate compounds related to vitamin A and to methods of preparing such derivatives and intermediates.

It is an object of this invention to prepare certain new compounds which are similar to vitamin A in structure. Another object is to prepare new compounds which possess vitamin A activity. A further object is to provide a method whereby polyene nitriles may be reduced to polyene amines. A still further object is to prepare vitamin A nitrile. Another object is to prepare vitamin A amine. Other objects will appear hereinafter.

These and other objects are accomplished by this invention which, in a preferred embodiment, includes subjecting β-ionone or a $C_{18}$ ketone which is an isoprenolog of β-ionone to a condensation reaction with cyanoacetic acid, or an ester thereof, and reducing the resulting nitrile or cyanoester with lithium aluminum hydride or aluminium hydride to an amine or alcohol amine compound.

In one aspect of this invention β-ionone (compound I) is condensed with cyanoacetic acid to form β-ionylidene acetonitrile (compound II) which is then reduced with an aluminum-containing hydride to β-ionylidene ethyl amine (compound III) in accordance with the following series of reactions:

REACTION 1

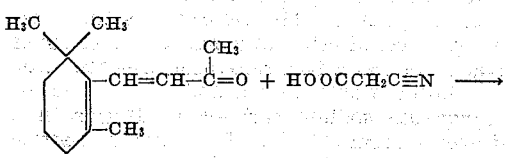

Compound I

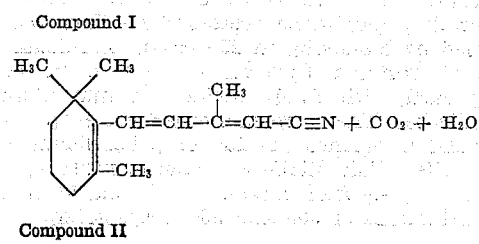

Compound II

REACTION 2

Compound II + $LiAlH_4$ ⟶

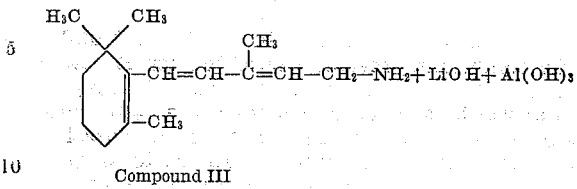

Compound III

In Reaction 2 water is added after compound II and lithium aluminum hydride have ceased reacting.

Reaction 1 may be carried out in the absence of a solvent but it is preferable to use a solvent such as benzene, toluene, petoleum ether, acetic acid, or propionic acid. If benzene is used as the solvent a cyanoacid will be produced instead of compound II and this must be decarboxylated in a separate step. However, if glacial acetic acid is the solvent, decarboxylation takes place spontaneously. It is preferred to react β-ionone with cyanoacetic acid in a solution of glacial acetic acid in the presence of small qantities of acetamide and ammonium acetate, which act as catalysts. Heat is applied over a period of several hours until the solvent and water formed during the reaction have evaporated. The residue is β-ionylidene acetonitrile which may be further purified by dissolving in ether, washing with water and dilute sodium carbonate, and drying by the addition of magnesium sulfate. The ether may then be evaporated off to leave a residue of purified β-ionylidene acetonitrile. The product may be further purified by distillation or chromatography.

In performing the reduction of Reaction 2, β-ionylidene acetonitrile is dissolved in ether and lithium aluminum hydride ($LiAlH_4$) or aluminum hydride ($AlH_3$) is added. A reaction takes place at room temperature. At the conclusion of the reaction water is added and the ether-soluble β-ionylidene ethyl amine separated from the aqueous mixture. The ether may be evaporated from the mixture to leave a residue of β-ionylidene ethyl amine.

In another aspect of this invention a $C_{18}$ ketone (compound IV) which is an isoprenolog of β-ionone is condensed with cyanoacetic acid, or an ester thereof, as in Reaction 1. These reactions are shown below:

REACTION 3

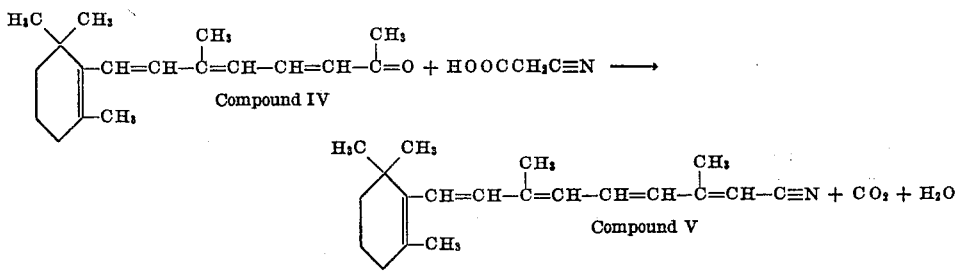

REACTION 4

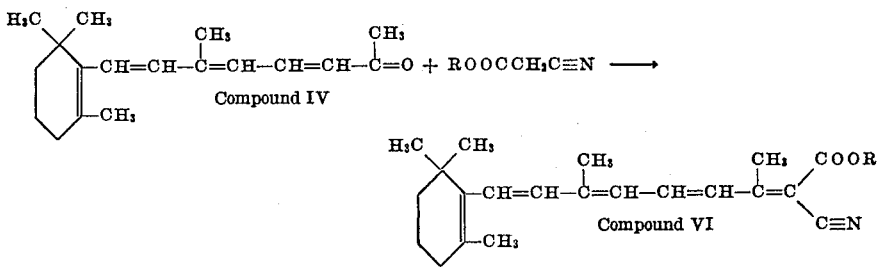

Reactions 3 and 4 may be carried out under the conditions previously specified for Reaction 1. The "C₁₈" ketone of Reactions 3 and 4 may be prepared by subjecting β-ionone to a Reformatsky reaction with a halocrotonate, dehydrating and saponifying the resulting product to produce β-ionylidene crotonic acid, and reacting this acid with lithium methyl to produce the "C₁₈" ketone, or it may be prepared by condensing β-ionone with ethyl bromoacetate in accordance with the Reformatsky reaction, dehydrating the resulting hydroxy ester, reducing the resulting ester with lithium aluminum hydride in ether solution to produce β-ionylidene ethanol, and oxidizing this alcohol in the presence of aluminum isopropoxide and an excess of acetone to produce the "C₁₈" ketone (compound IV).

Compound V is vitamin A nitrile and compound VI is a cyanoester closely related to vitamin A. Both compounds V and VI are useful in vitamin A synthesis.

R in Reaction 4 may be hydrogen as in Example 3 or it may be an aromatic or aliphatic alcohol radical such as —CH₃, —C₂H₅, —C₆H₅, —C₁₆H₃₃, —C₁₈H₃₇, —C₇H₇, etc. As used herein the term "alcohol radical" is defined as the portion of an ester molecule derived from an alcohol. It is analogous to the term "acyl radical" which is the portion of an ester molecule derived from an acid.

Compound V may be reduced to vitamin A amine (compound VII) under the conditions of Reaction 2 in the following manner:

REACTION 5

Compoud V + LiAlH₄ ⟶

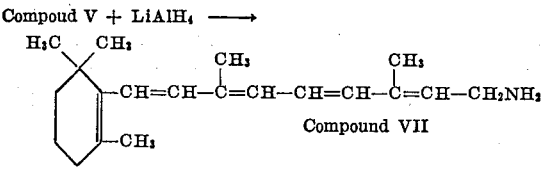

Compound VII has been tested for biological activity and has been found to possess at least 25% of the biopotency of vitamin A.

By following the series of reactions disclosed above it is possible to convert β-ionone into a compound of the formula

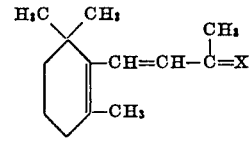

in which X is either =CH—CH₂NH₂ or $$=CH—CH=CH—\overset{CH_3}{\underset{|}{C}}=Y$$

wherein Y is either =CH—CH₂NH₂,

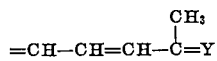

or =CH—C≡N, R being hydrogen, an alkyl group, or an aryl group.

The following specific examples further illustrate the invention:

*Example 1.—Preparation of β-ionylidene acetonitrile*

A mixture of 20 g. of β-ionone, 8.5 g. of cyanoacetic acid, 40 cc. of glacial acetic acid, 1 g. of acetamide, and 1 g. of ammonium acetate was heated on an oil bath until the acetic acid solvent and water formed in the reaction began to distill from the mixture. The reaction mixture was then held at this distillation temperature for four hours. The residue was then dissolved in 60 cc. of ether and washed three times with 50 cc. of water in a separatory funnel. The ether solution was next washed with 50 cc. of dilute aqueous sodium carbonate. It was then dried over sodium sulfate. The ether was evaporated from the mixture to leave a residue of crude β-ionylidene acetonitrile. This was purified by dissolving in 200 cc. of petroleum ether and running through an adsorption column packed with finely divided sodium aluminum silicate. The petroleum ether was evaporated to yield a purified residue of β-ionylidene acetonitrile. This nitrile was characterized by ultraviolet adsorption maxima at 255 and 304 mμ, with extinctions of 566 and 565, respectively.

Example 2.—Preparation of β-ionylidene ethyl amine

β-Ionylidene acetonitrile (0.5 g.) was dissolved in 5 ml. of ether and 2 ml. of a lithium aluminum hydride (approximately 1 molar) was added at room temperature. A slight reaction occurred and the mixture was allowed to stand at room temperature for five minutes, whereupon the excess lithium aluminum hydride was destroyed by the careful addition of water. The ether-soluble oil was separated from the lithium hydroxide and aluminum hydroxide by filtration and the ether solution washed with water, dried over sodium sulfate and the solvent removed under nitrogen. The residue consisted of β-ionylidene ethyl amine which had an absorption maximum at 265 mμ and an extinction of 426.

Example 3.—Vitamin A nitrile $C_{18}$ ketone (compound IV) (5.2 g., 90% pure, 0.018 mole) was dissolved in 50 ml. of glacial acetic acid which contained 1.5 g. cyanoacetic acid, 0.3 g. ammonium acetate, and 0.3 g. acetamide. The mixture was refluxed in an oil bath at 160° for two hours, after which 35 ml. of acetic acid was slowly distilled off. The product was dissolved in 40 cc. of ether, washed with 40 cc. of water three times in a separatory funnel, washed again with 0.5 normal sodium hydroxide, and finally washed with 20 cc. portions of water to neutrality. The ether solution was dried over sodium sulfate and the solvent removed under nitrogen. The product showed a strong nitrile absorption in the infrared and had an ultraviolet extinction of 405 with a maximum at 350 mμ. This product was further purified by dissolving in 100 cc. of petroleum ether and running through a column packed with finely divided sodium aluminum silicate. The ultraviolet extinction coefficient was then 745.

Example 4.—Preparation of vitamin A nitrile ethyl acetate $C_{18}$ ketone (compound IV) (6 g., .021 mole) was dissolved in 60 ml. glacial acetic acid which contained 2.0 g. of cyano ethyl acetate, 0.3 g. of ammonium acetate and 0.3 g. of acetamide. The mixture was refluxed in an oil bath at 160° for two hours, after which 35 ml. of acetic acid was slowly distilled off. The product was dissolved in 50 ml. of ether, washed three times with 50 ml. of water, once with 50 ml. of 0.5 normal sodium hydroxide, and finally with successive 50 ml. portions of water until neutrality was attained. The ether solution was dried over sodium sulfate and the solvent removed under nitrogen. The residue consisted of vitamin A nitrile ethyl acetate which had an ultraviolet extinction coefficient of 433 with a maximum at 375 mμ.

Example 5.—Vitamin A amine

Vitamin A nitrile (0.5 g.) was dissolved in 50 ml. of ether to which was added 2 ml. of lithium aluminum hydride (1 molar). The mixture reacted with some refluxing. When the mixture ceased to reflux it was heated for an additional minute on the steam bath. Decomposition of the excess lithium aluminum hydride was accomplished with water. The ether layer was decanted to a separatory funnel in which it was washed with water to neutrality. It was then dried over sodium sulfate and the solvent removed under nitrogen without heat. The product (0.5 g.) showed an absence of the cyanide group in the infrared. It had an ultraviolet absorption maximum at 325 mμ with $$E_{1cm.}^{1\%} = 591$$

On treatment with an antimony trichloride this compound gave a reddish-purple color. A test for the primary amine grouping, using fluorescein chloride, was positive.

While the invention had been described in considerable detail in the above examples and description, it will be understood that modifications and variations therein may be effected without departing from the spirit and scope of the invention as it is defined by the appended claims.

What I claim is:

1. As a new chemical compound a substance of the formula

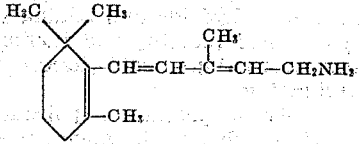

2. The method of making a polyene amine which comprises refluxing in glacial acetic acid, a member selected from the group consisting of

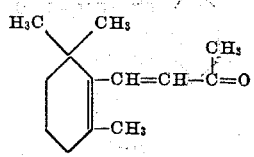

and

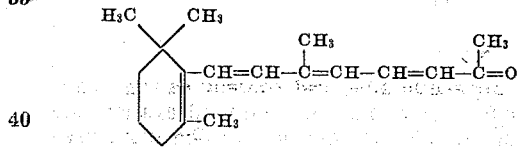

with a compound selected from the class consisting of cyanoacetic acid and esters thereof and thereby causing condensation of said reactants and autodecarboxylation of the condensation product to an unsaturated polyene nitrile, and thereafter reacting, in ether solution, said unsaturated polyene nitrile with a compound selected from the group consisting of aluminum hydride and lithium aluminum hydride effective to reduce the nitrile group thereof to an amino group without otherwise changing the unsaturation of said decarboxylated condensation product, and hydrolyzing the product of said reacting with water.

3. The method of making a compound exhibiting substantial vitamin A biological activity, which method comprises refluxing in glacial acetic acid a compound of the formula

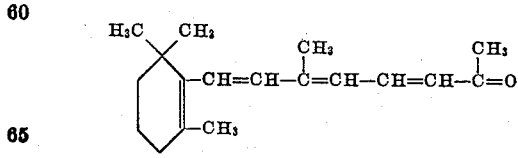

with a compound selected from the class consisting of cyanoacetic acid and esters thereof and thereby causing condensation of said reactants and autodecarboxylation of the condensation product to vitamin A nitrile, and thereafter reacting, in ether solution, said vitamin A nitrile with a compound selected from the class consisting of aluminum hydride and lithium aluminum hydride and adding water to the product of said reacting and thereby effecting reduction of said vitamin A nitrile to vitamin A amine.

4. The method of making vitamin A amine which comprises refluxing in glacial acetic acid a compound of the formula

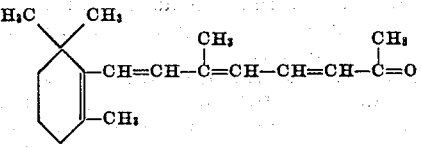

with cyanoacetic acid thereby causing condensation of said reactants and autodecarboxylation of the condensation product to vitamin A nitrile, and thereafter reacting, in ether solution, said vitamin A nitrile with a compound selected from the group consisting of aluminum hydride and lithium aluminum hydride and adding water to the product of said reacting and thereby effectively causing reduction of said vitamin A nitrile to vitamin A amine.

5. The method of making a polyene amine which comprises refluxing, in glacial acetic acid, a member selected from the class consisting of

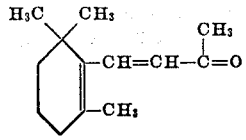

and

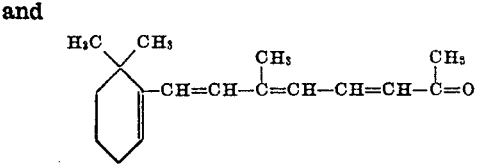

with cyanoacetic acid and thereby causing condensation of said member and said cyanoacetic acid and autodecarboxylation of the condensation product to an unsaturated polyene nitrile, and thereafter reacting, in ether solution, said unsaturated polyene nitrile with a compound selected from the class consisting of aluminum hydride and lithium aluminum hydride and adding water to the product of said reacting and thereby reducing said polyene nitrile to the corresponding polyene amine.

6. The method of making a polyene amine which comprises refluxing, in glacial acetic acid, a member selected from the class consisting of

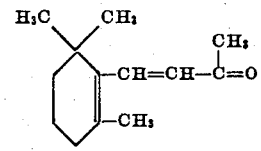

and

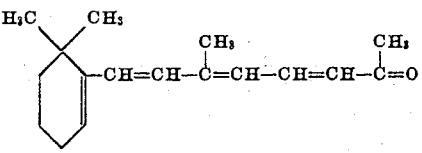

with cyanoacetic acid and thereby causing condensation of said member and said cyanoacetic acid and autodecarboxylation of the condensation product to an unsaturated polyene nitrile, and thereafter reacting said unsaturated polyene nitrile with lithium aluminum hydride in ether solution and adding water to the product of said reacting and thereby reducing said polyene nitrile to the corresponding polyene amine.

LEONARD WEISLER.

REFERENCES CITED

The following references are of record in the file of this patent:

UNITED STATES PATENTS

| Number    | Name       | Date          |
|-----------|------------|---------------|
| 2,150,154 | Cope       | Mar. 14, 1939 |
| 2,176,018 | Cope et al.| Oct. 10, 1939 |
| 2,369,158 | Milas      | Feb. 13, 1945 |
| 2,381,882 | Cupery     | Aug. 14, 1945 |
| 2,414,722 | Cornwell   | Jan. 21, 1947 |
| 2,415,834 | Milas      | Feb. 18, 1947 |
| 2,432,921 | Milas      | Dec. 16, 1947 |

OTHER REFERENCES

Finholt et al.: "J. Am. Chem. Soc.," vol. 69, 199–1203 (May 1947).